United States Patent
Laudrain et al.

(10) Patent No.: US 8,941,817 B2
(45) Date of Patent: Jan. 27, 2015

(54) METHOD FOR POINTING A PLURALITY OF PREDETERMINED LOCATIONS INSIDE A STRUCTURE AND CORRESPONDING POINTING SYSTEM

(75) Inventors: Yann-Henri Laudrain, La Turballe (FR); Marc Lelay, Montoir de Bretagne (FR)

(73) Assignee: Airbus Operations (SAS), Toulouse Cedex (FR)

(*) Notice: Subject to any disclaimer, the term of this patent is extended or adjusted under 35 U.S.C. 154(b) by 389 days.

(21) Appl. No.: 13/471,584

(22) Filed: May 15, 2012

(65) Prior Publication Data
US 2012/0300093 A1 Nov. 29, 2012

(30) Foreign Application Priority Data
May 24, 2011 (FR) .................................. 11 54527

(51) Int. Cl.
| | | |
|---|---|---|
| *B64F 5/00* | (2006.01) | |
| *B41J 3/407* | (2006.01) | |
| *G05D 1/02* | (2006.01) | |
| *G05B 19/402* | (2006.01) | |

(52) U.S. Cl.
CPC ............... *B64F 5/0009* (2013.01); *B41J 3/407* (2013.01); *G05D 1/0246* (2013.01); *G05B 19/402* (2013.01)
USPC ...................................................... 356/4.01

(58) Field of Classification Search
CPC .......... G01C 25/00; G01C 15/02; G01C 1/06; G01B 11/26
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | | |
|---|---|---|---|---|
| 2002/0171821 | A1* | 11/2002 | Cloud et al. | ................. 356/4.01 |
| 2010/0277747 | A1* | 11/2010 | Rueb et al. | ..................... 356/614 |
| 2010/0283195 | A1 | 11/2010 | Hazlehurst et al. | |

FOREIGN PATENT DOCUMENTS

| | | |
|---|---|---|
| JP | 55082657 | 6/1980 |
| JP | 08001552 | 1/1996 |
| JP | 2001289638 | 10/2001 |
| JP | 2003039347 | 2/2003 |

OTHER PUBLICATIONS

French Patent Office, Preliminary Search Report for FR 1154527, Feb. 3, 2012 (2 pgs.).

* cited by examiner

*Primary Examiner* — Luke Ratcliffe
(74) *Attorney, Agent, or Firm* — Wood, Herron & Evans, LLP

(57) ABSTRACT

Embodiments of the disclosure include methods in which locations within an aircraft fuselage are automatically pointed to and marked so that a part may be fastened at each marked location. A mobile assembly includes a video camera that may capture images of the aircraft fuselage. A plurality of predetermined locations may be visualized and verified by a successive implementation of a first image recognition process and a second image recognition process. The mobile assembly may then automatically point to the predetermined locations after each has been identified and mark each predetermined location.

15 Claims, 2 Drawing Sheets

METHOD FOR POINTING A PLURALITY OF PREDETERMINED LOCATIONS INSIDE A STRUCTURE AND CORRESPONDING POINTING SYSTEM

TECHNICAL FIELD

The present invention relates to a method for pointing a plurality of part predetermined locations inside a structure, including an aircraft fuselage portion and a corresponding pointing system.

BACKGROUND

Upon the assembling of electromechanical system assemblies, for example embedded on board civil transport planes, a large number of specialized operators intervene, each of them having to perform one or more predefined tasks.

As an example, the fastening of parts—for example mobile supports—on the primary structure of a fuselage portion requires three distinct types of skill allowing anyone to perform a particular operation. Thus, an operator applies manually—upon a first step—markings on the primary structure on predetermined places. As soon as the markings are performed—upon a second step—the primary structure is bored with the help of the part to be fastened (used as a template) so as to position the bores with precision. Upon a last step, the part fastening on the fuselage structure is completed by screwing, riveting or gluing to the corresponding frames.

However, amongst the operations implemented upon the fastening of such parts, the marking operation proves to be the longest and the most tiresome. Furthermore, it is found that, when a mounting problem occurs, the marking operation is frequently at the origin of such problem, the marking being made being approximate, even incorrect.

An object of the present invention is to remedy such disadvantages and including to perform a reliable marking of a structure in a limited time.

SUMMARY

To this end, according to the invention, the method for pointing a plurality of predetermined locations inside a primary structure, for example of an aircraft fuselage portion, includes:

A/ at least one mobile assembly is formed, comprising at least one video camera, for example with a high definition;

B/ inside said structure, a plurality of positions are determined, from each of which said mobile assembly can reach at least one of said predetermined locations;

C/ said mobile assembly is automatically moved from a position to another of said plurality thanks to a first image recognition process performed by said video camera and being able to recognize said positions; and D/ at each of said positions thus reached by said mobile assembly, at least one of said predetermined locations associated with said position being reached is automatically pointed thanks to a second image recognition process performed by said video camera and being able to recognize said location(s) associated with each position being reached.

Thus, thanks to the invention, an automatic pointing can be performed, with or without contact, of predetermined locations inside the structure, for example an aircraft fuselage portion, so as to limit—even to cancel—the intervention of specialized operators for this type of operation on such assembling step. While reducing the human intervention for some tasks upon the mounting of an aircraft, the risk of errors for the positioning or the absence of parts is reduced while making the mounting of these parts more uniform within a same aircraft or even between various aircrafts of the same type.

Upon said first image recognition process of step C/, the following steps can be carried out:

the surface of said structure is swept with the help of said video camera so as to obtain a plurality of images of the latter; and each one of the images obtained is compared to reference images associated respectively with said positions of said plurality, so as to recognize said positions on said images being obtained.

Moreover, during said second image recognition process of step D/, the following steps can be performed:

the surface of said structure is swept in the vicinity of said position reached with the help of said video camera so as to obtain a plurality of images of said structure on said position being reached; and each one of the images obtained is compared to reference images associated respectively with said position being reached so as to recognize at least one of said predetermined locations being associated on at least one of said obtained images.

In an implementation of the invention, said mobile assembly further comprising a marking device (for example, an inkjet printing nozzle), the latter is upon step D/ automatically moved, thanks to said second recognition process, for marking at least one of said recognized predetermined locations.

Thus, an automatic pointing is made as a marking of the predetermined location(s) inside the structure. In the particular case of the marking for locations of parts to be fastened on the primary structure of a fuselage portion, the marking operation being performed automatically, no specialized operator is necessary, reducing as a matter of fact the marking errors in the locations—and thus for the subsequent positioning of the parts on the structure of the fuselage portion—and homogenizing the markings on the portion structure. In this last case, the human intervention upon the mounting of an aircraft is reduced.

In another implementation of the invention, a part having been fastened on said primary structure to at least one of said predetermined locations, said automatic pointing step D/ is a step for an automatic checking, with the help of said video camera and by implementing a calculation algorithm for geometrical differences, that said part has been correctly positioned with respect to the reference images on said structure on said corresponding location.

Upon such automatic checking after positioning and fastening the parts, a report can be emitted listing the error(s) being found (positioning error, orientation error, absence of a part, damaging of a part, etc.).

Furthermore, the present invention also relates to a system for automatically pointing a plurality of predetermined locations inside a primary structure, for example of an aircraft fuselage portion, being remarkable in that it comprises:

at least, one mobile assembly comprising at least one video camera;

means for moving automatically said mobile assembly from a position to another one in a plurality of determined positions inside said structure, from each of which said mobile assembly can reach at least one of said predetermined locations, thanks to a first image recognition process performed by said video camera and able to recognize said positions; and means for automatically pointing, on each of said positions thereby reached by said mobile assembly, at least one of said predetermined locations associated with said position reached thanks to a second image recognition process performed by said video camera and being able to recognize the location(s) associated with each position being reached.

So, thanks to the invention, such pointing system can be autonomous and thus do not require any human intervention for the checking thereof.

In an embodiment of the present invention, said mobile assembly also comprises a marking device, for example an inkjet printing nozzle so as to mark at least one of said locations being predetermined and recognized by said second image recognition process.

Said mobile assembly can further comprise a sensor.

Preferably, said mobile assembly is a jointed arm mounted on a mobile frame.

The figures of the accompanying drawing will make well understood how the invention can be implemented. On such figures, identical references mean similar elements.

DETAILED DESCRIPTION

Figure 1:
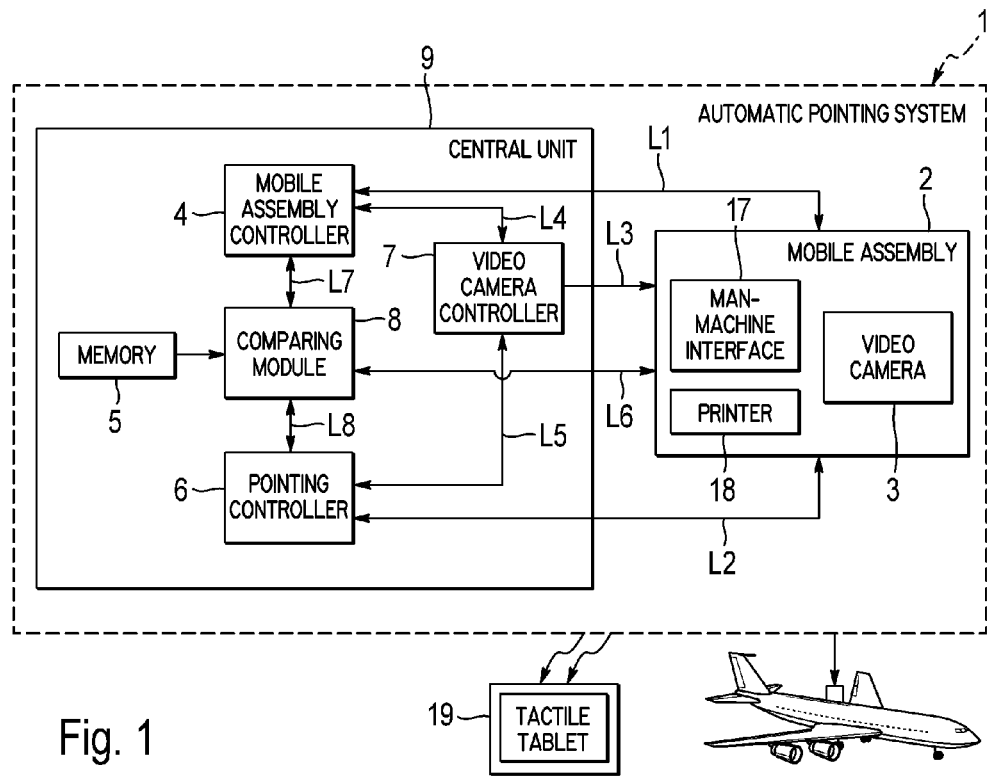
FIG. 1 shows a block diagram of a pointing system according to the present invention.

As shown in FIG. 1, a system 1 according to the invention is represented by a block diagram to automatically point to a plurality of predetermined locations inside, for example, an aircraft fuselage portion of a primary structure.

The automatic pointing system 1 comprises:
- a mobile assembly 2 comprising a high definition video camera 3. Alternatively, the mobile assembly could comprise several video cameras so as to improve the precision and the stability of the automatic pointing;
- a mobile assembly controller 4 that is configured to automatically move the mobile assembly 2 from a first position to a second position based on a plurality of previously determined positions saved in a memory 5. The mobile assembly 2 may visualize a plurality of predetermined locations where each predetermined location is associated with a corresponding previously determined position saved in the memory 5. The mobile assembly 2 implements a first image recognition process performed by the video camera 3 where the video camera 3 recognizes the positions reached based on the each of the corresponding previously determined positions saved in the memory 5. The mobile assembly controller 4 is connected to the mobile assembly 2 through the link L1; and
- a pointing controller 6 that is configured to automatically point, for each of the positions thus moved to by the mobile assembly 2, at least one of the predetermined locations that is associated with the previously determined position saved in the memory 5. The mobile assembly 2 implements a second image recognition process performed by the video camera 3 where the video camera 3 is able to recognize each of the predetermined location(s) associated with each previously determined position. The pointing controller 6 is connected to the mobile assembly 2 through the link L2.

The automatic pointing system 1 of the invention also comprises:
- a video camera controller 7 that is configured to control the movement and the activation or inactivation of the video camera 3 so that it can sweep, at least partially, in the inside of the fuselage portion and capture a plurality of images of the inside of the fuselage portion. The video camera controller 7 is connected to the mobile assembly 2, to the mobile assembly controller 4 and to the pointing controller 6 through the links L3, L4, and L5, respectively; and
- a comparing module 8 that is configured to compare the images captured by the video camera 3 upon a partial or integral sweeping inside the fuselage portion. After the images are captured, the comparing module 8 may compare the images to reference images associated respectively with the positions saved in the memory 5. The comparing module 8 is connected to the video camera 3, to the the mobile assembly controller 4 and to the pointing controller 6 through links L6, L7, and L8, respectively.

The mobile assembly controller 4 is further configured to monitor the pointing controller 6 so as to execute a first recognition of the images captured by the video camera 3. In executing the first recognition of the images, the mobile assembly 2 may recognize each of the previously determined positions from the images captured by the video camera 3 upon a sweeping of the portion inside. From the recognition information about the positions transmitted by the comparing module 8, the the mobile assembly controller 4 may determine and transmit movement information of the mobile assembly 2 to the video camera controller 7, so that the video camera controller may establish and communicate control orders to drive engines of the mobile assembly 2 (not represented on the figures) so as to automatically move the mobile assembly 2 from the first position to to the second position. The driving engines are also able to move and orient the video camera 3.

In a similar way, the pointing controller 6 is further configured to monitor the video camera controller 7. Thus, on each of the positions travelled to by the mobile assembly 2, the pointing controller 6 executes a second recognition of images so as to precisely and automatically recognize each of the predetermined locations associated with each of the corresponding previously determined positions. Each of the predetermined locations may be automatically recognized from recognition information associated with the locations of the previously determined position being transmitted by the comparing module 8. Specifically, the pointing controller 6 transmits the recognition information associated with the movement of the video camera 3 to the video camera controller 7, so that the video camera controller 7 may determine and communicate control orders to the driving engines of the mobile assembly 2 to automatically move the video camera 3 to perform pointing automatically.

The mobile assembly controller 4, the pointing controller 6, the video camera controller 7, the comparing module 8 and the memory 5 are integrated into a central unit 9.

The central unit 9 can be arranged outside the mobile assembly or, alternatively, embedded on board the latter.

Whatever, the arrangement of the central unit 9 (on board or not), the latter can communicate with the mobile assembly 2 thanks to the links L1, L2, L3 and L6 being wired or not.

Figure 2:
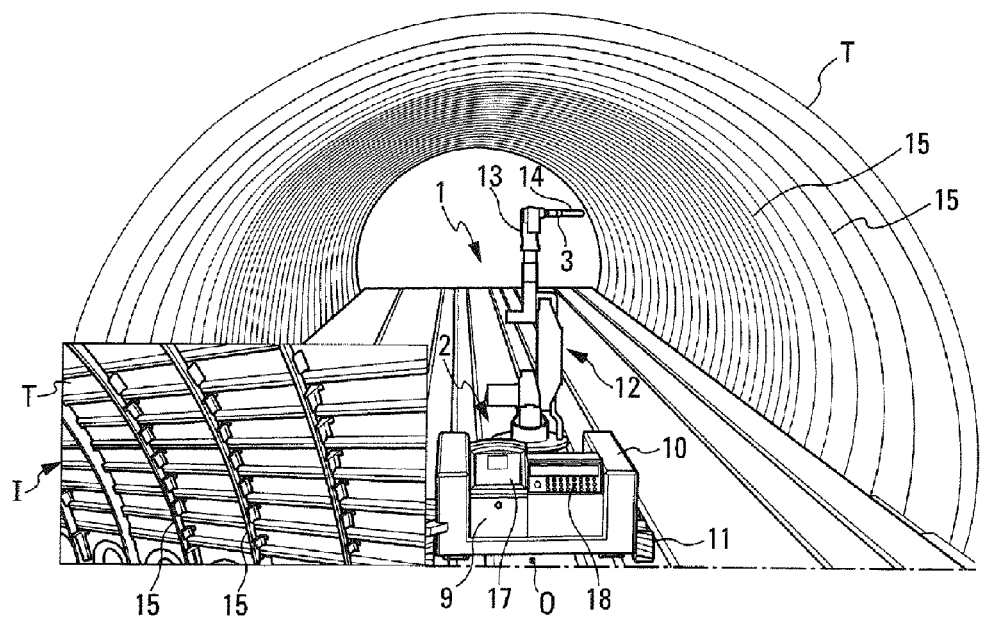
FIG. 2 is a schematic view of an examplary embodiment of the autonomous pointing system according to the invention, moving inside a fuselage portion.
Figure 3:
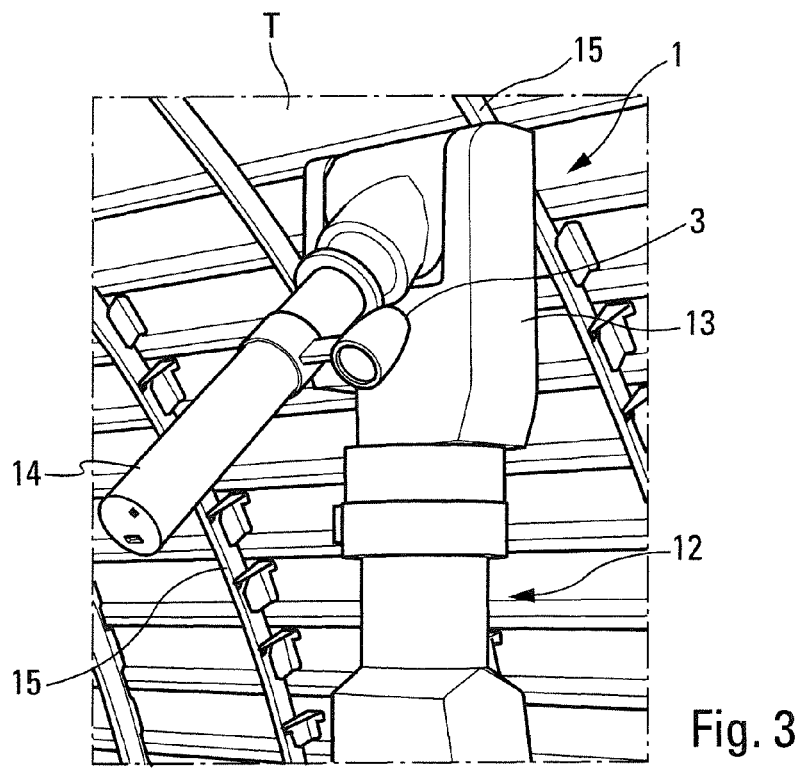
FIG. 3 is a schematic enlargement of the pivoting head of the automatic pointing system of FIG. 2.
Figure 4:
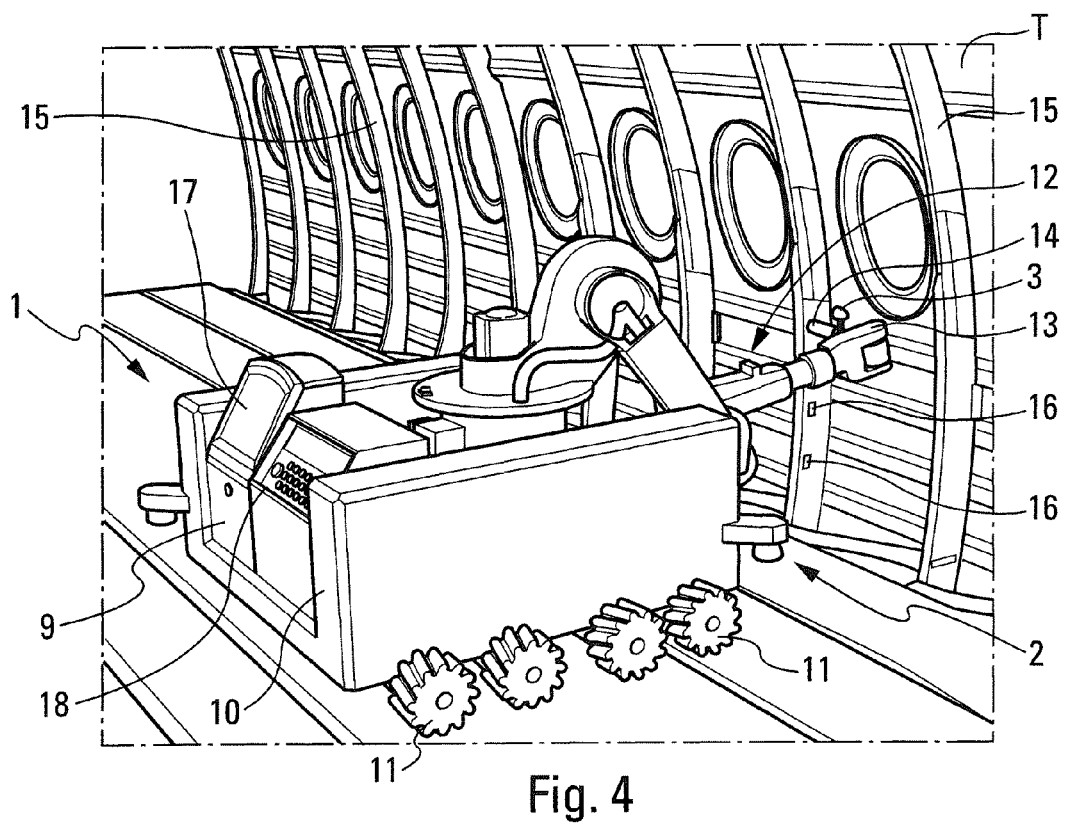
FIG. 4 schematically illustrates the automatic pointing system of FIG. 2 upon a marking operation on a primary structure of a fuselage portion.

As shown by the exemplary embodiment of the FIGS. 2 to 4, the automatic pointing system 1 is applied to the marking of a plurality of predetermined locations inside a portion of an aircraft fuselage (T).

In such example, the mobile assembly 2 is present under the shape of a robot comprising a frame 10 mounted on wheels 11 and on which a jointed arm 12 is rotationally fastened.

The jointed arm 12 comprises, on its free end, a pivoting head 13 on which the video camera 3 is mounted being mobile. Thanks to the different articulation of the arm 12, the video camera 3 possesses six degrees of freedom, thus enabling it to be moved and oriented in all conceivable directions.

The pivoting head 13 of the robot 2 comprises furthermore an inkjet printing nozzle 14 on which the video camera 3 is fastened. The printing nozzle 14 is able to mark at least one of said predetermined locations and recognized during the second image recognition process.

In this example, the central unit 9 is mounted on board the frame 10.

To mark the predetermined location, for example on the frames 15 of the portion T, the automatic pointing system 1, occupying a starting position O defined with respect to the inside of the fuselage portion T, implements the first image recognition process by sweeping by the help of the camera 3 inside said portion T, as shown on FIG. 2. On such figure, the area I illustrates the image obtained for the orientation of the represented video camera 3.

The first image recognition process allows the automatic pointing system 1 to recognize, through a controlled movement of the video camera 3 by the mobile assembly controller 4, the positions of the plurality of previously determined positions saved in the memory 5. From each of previously determined positions saved in the memory 5, the mobile assembly 2 may visualize each of the predetermined locations to be marked and then move autonomously towards each of the remaining previously determined positions saved in memory one after the other. To perform those movements, the mobile assembly controller 4 of the central unit 9 transmits corresponding control orders to the driving engines of the wheels 11 and the jointed arm 12.

Location means by GPS ("Global Positioning System") not represented on the figures, can be mounted on the automatic pointing system 1 so as to improve the movement of the latter to reach the recognized positions.

When it has reached one of the positions being recognized thanks to the first image recognition process, the system 1 perform an automatic pointing of one of the locations to be marked, associated with said position being reached, by the second image recognition process. Once the location pointed by the printing nozzle 14 through a movement of the jointed arm 12, the latter marks the structure of the fuselage portion T by making a print 16.

As an illustrative example, when the marking of a location makes a step being preliminary to the fastening of a part (for example, a support for electrical or mechanical systems), the print 16 can represent the various contours of the part side which is adapted to come in contact with the structure of the portion T once fastened, as well as the possible areas to be bores in the structure. The print 16 can also contain information being specific to the part itself, as a particular reference, a predefined name, etc.

When one of the locations associated with the position being recognized and reached by the automatic pointing system 1 has been marked, the marking operation is repeated for the whole predetermined locations associated with the position being reached.

As soon as all the predetermined locations of the reached position has been marked, the automatic pointing system 1 is moved automatically towards the following recognized position thanks to first image recognition process so as to perform the marking of the predetermined location associated with this new position being recognized.

The pointing system 1 moves thus automatically from one position to another one amongst said plurality of positions to mark the totality of the corresponding locations.

A report listing all the locations being marked can be transmitted by the central unit 9 to a man-machine interface 17 or to a printer 18, mounted on the frame 10.

After marking the predetermined locations, a specialized operator bores the structure of the portion T on the places indicated by said marking 16. Another operator puts and fastens then the parts on the corresponding marked locations.

When all the parts have been fastened to the respective locations, the automatic pointing system 1 can perform a checking of the positioning of the so fastened parts.

For that, the automatic pointing system 1 performs operations being similar to those previously described by referring to the marking of the predetermined locations.

In particular, the automatic pointing system 1, occupying again the starting position O, implements the first image recognition process by sweeping with the head of the video camera 3 the inside of said portion T (FIG. 2):

in order to recognize, through a control movement of the video camera 3 by the mobile assembly controller 4, the positions of the plurality of positions saved in the memory 5 and from each of which it can visualize the parts fastened on the predetermined marked locations.

in order to move automatically towards each of said positions being recognized one after the other in such a way.

When it has reached one of the positions recognized thanks to the first image recognition process, the system 1 performs an automatic pointing of one of the parts fastened on one of the predetermined location, associated with said position being reached, by the second image recognition process.

When the automatic pointing for checking has been performed for each of the parts associated with the position reached by the automatic pointing system 1, the latter is moved automatically towards the following recognized position thanks to the first image recognition process, so as to verify the positioning of the parts fastened on the predetermined locations associated with this new position, for example, by implementation of a calculation algorithm for geometrical differences.

The automatic pointing system 1 moves thus automatically from a position to another one amongst said plurality of positions to check than the parts have been correctly fastened on the corresponding locations.

An error report can be sent by the central unit 9 to the man-machine interface 17, to the printer 18, to a tactile tablet 19 manipulated by a specialized operator, or even to an electronical spectacles worn by the latter.

In this error report, the predetermined locations can specifically be present, for which the parts associated present for example an error or an absence of positioning, it is necessary to check and, the case being, to correct.

Obviously, in an alternative, an automatic pointing system for checking, being distinct of an automatic pointing system used for marking, could be implemented to perform only the checking of the positioning of the parts on the predetermined locations manually marked or by the automatic pointing system applied to the marking according to the invention.

Furthermore, the present invention is in no way limited to the pointing with a marking of a fuselage portion, but applies to any desirable structure.

The invention claimed is:

1. A method for pointing a plurality of predetermined locations inside an aircraft fuselage portion of a primary structure, the method comprising:
    retrieving a plurality of previously determined positions stored in a memory associated with a mobile assembly that includes a video camera, wherein the mobile assembly is to move to the previously determined positions to visualize predetermined locations in the aircraft fuselage portion that are associated with the previously determined positions;
    capturing a plurality of images of the aircraft fuselage portion by the video camera, wherein the plurality of captured images depicts each of the previously determined positions;
    performing a first image recognition process to identify when the mobile assembly has moved to each of the previously determined positions, and performing a second image recognition process to point to and identify the predetermined locations associated with the previously determined positions, wherein the first and second image recognition processes are performed by comparing the plurality of captured images to a plurality of reference images associated with known ones of the previously determined positions in the memory;
    automatically moving the mobile assembly from a first previously determined position to a second previously determined position based on the performance of the first image recognition process; and
    automatically pointing to each predetermined location when the mobile assembly has arrived at each corresponding previously determined position, to thereby mark each predetermined location in the aircraft fuselage portion, based on the performance of the second image recognition process.

2. The method according to claim 1, wherein performing the first image recognition process further comprises:
    comparing each of the captured images to each of the reference images to determine whether each of the captured images is within a threshold of any previously determined position associated with the reference images to thereby recognize when the mobile assembly has reached one of the previously determined positions.

3. The method according to claim 2, wherein performing the second image recognition process further comprises:
    comparing each of the captured images to each of the reference images to determine whether each of the captured images is within a threshold of any predetermined location associated with the reference images to thereby recognize when the mobile assembly has visualized and identified one of the predetermined locations.

4. The method according to claim 1, further comprising:
    automatically moving a marking device included in the mobile assembly to mark each of the recognized predetermined locations.

5. The method according to claim 1, further comprising:
    automatically checking each predetermined location after a part has been fastened to the aircraft fuselage portion at each predetermined location by calculating geometrical differences between a location of the part and each previously determined position associated with the reference images.

6. The method according to claim 5, further comprising:
    generating a report listing error(s), wherein each error occurs when the calculated geometrical difference between the location of the part and the corresponding previously determined position located in the plurality of reference images exceeds a threshold.

7. A system for automatically pointing a plurality of predetermined locations inside an aircraft fuselage portion of a primary structure, the system comprising:
    a mobile assembly;
    a video camera included in the mobile assembly and configured to capture a plurality of images of the aircraft fuselage portion, wherein the plurality of images depicts a plurality of previously determined positions;
    a mobile assembly controller configured to retrieve the plurality of previously determined positions stored in a memory associated with the mobile assembly, and automatically move the mobile assembly from a first previously determined position to a second previously determined position, based on performance of a first image recognition process that identifies when the mobile assembly has moved to each of the previously determined positions;
    a pointing controller configured to automatically point to each predetermined location when the mobile assembly has arrived at each corresponding previously determined position, to thereby mark each predetermined location in the aircraft fuselage portion, based on performance of a second image recognition process that identifies the predetermined locations associated with the previously determined positions; and
    a comparing module configured to compare the plurality of captured images to a plurality of reference images stored in a memory associated with the mobile assembly, the plurality of reference images being associated with known ones of the previously determined positions, to thereby perform the first and second image recognition processes.

8. The system according to claim 7, wherein the pointing controller is further configured to automatically move a marking device included in the mobile assembly to mark each of the recognized predetermined locations.

9. The system according to claim 7, wherein the mobile assembly further comprises a sensor.

10. The system according to claim 8, wherein the marking device is an inkjet printing nozzle.

11. The system according to claim 7, wherein the mobile assembly includes a jointed arm mounted on a mobile frame.

12. The system according to claim 7, wherein the comparing module is further configured to compare each of the captured images to each of the reference images to determine whether each previously determined position associated with the captured images is within a threshold of any of the previously determined position associated with the reference images to thereby recognize when the mobile assembly has reached one of the previously determined positions.

13. The system according to claim 12, wherein the comparing module is further configured to compare each of the captured images to each of the reference images to determine whether each of the captured images is within a threshold of any predetermined location associated with the reference images to thereby recognize when the mobile assembly has visualized and identified one of the predetermined locations.

14. The system according to claim 7, wherein the comparing module is further configured to automatically check each predetermined location after a part has been fastened to the aircraft fuselage portion at each predetermined location by calculating geometrical differences between a location of the part and each previously determined position.

15. The system according to claim 14, wherein the comparing module is further configured to generate a report listing error(s), wherein each error occurs when the calculated geometrical difference between the location of the part and the corresponding previously determined position located in the plurality of reference images exceeds a threshold.

* * * * *